US012333264B1

(12) United States Patent
Hoang et al.

(10) Patent No.: US 12,333,264 B1
(45) Date of Patent: Jun. 17, 2025

(54) FUZZY-MATCH AUGMENTED MACHINE TRANSLATION

(71) Applicant: Amazon Technologies, Inc., Seattle, WA (US)

(72) Inventors: Cuong Hoang, San Jose, CA (US); Prashant Mathur, New York, NY (US); Marcello Federico, Trento, TN (US); Devendra Singh Sachan, Montreal (CA)

(73) Assignee: Amazon Technologies, Inc., Seattle, WA (US)

( * ) Notice: Subject to any disclaimer, the term of this patent is extended or adjusted under 35 U.S.C. 154(b) by 610 days.

(21) Appl. No.: 17/655,624

(22) Filed: Mar. 21, 2022

(51) Int. Cl.
*G10L 15/22* (2006.01)
*G06F 40/51* (2020.01)
*G06F 40/58* (2020.01)

(52) U.S. Cl.
CPC .............. *G06F 40/58* (2020.01); *G06F 40/51* (2020.01)

(58) Field of Classification Search
None
See application file for complete search history.

(56) References Cited

U.S. PATENT DOCUMENTS

| | | | | |
|---|---|---|---|---|
| 10,762,302 B2* | 9/2020 | Lee | .......................... | G06N 5/025 |
| 10,878,201 B1* | 12/2020 | Wuebker | .................. | G06N 3/08 |
| 2019/0129947 A1* | 5/2019 | Shin | ....................... | G06F 40/284 |
| 2020/0192985 A1* | 6/2020 | Na | ........................... | G06F 40/30 |
| 2021/0165976 A1* | 6/2021 | Lee | ........................ | G06F 40/58 |
| 2021/0365644 A1* | 11/2021 | Mei | ......................... | G06N 3/08 |
| 2022/0108083 A1* | 4/2022 | Zydron | ................... | G06F 40/30 |
| 2022/0293086 A1* | 9/2022 | Marchini | .............. | G10L 21/003 |
| 2022/0382998 A1* | 12/2022 | Tang | ..................... | G10L 13/047 |
| 2023/0013777 A1* | 1/2023 | Jia | ........................... | G10L 15/26 |
| 2023/0274102 A1* | 8/2023 | Marie | .................... | G06N 20/00 704/2 |
| 2024/0111967 A1* | 4/2024 | Wang | ..................... | G06F 40/58 |

* cited by examiner

*Primary Examiner* — Neeraj Sharma

(74) *Attorney, Agent, or Firm* — Knobbe, Martens, Olson & Bear, LLP

(57) ABSTRACT

Systems and methods are provided for use of use of fuzzy-match-based translation suggestions to augment machine translation of input sentences or other texts. A machine translation system may use a model trained to translate a source language input to a target language output based on pseudo-randomly selected translation suggestions in the target language, while at inference time the machine translation system may use translation selections associated with source language samples that have a high degree of similarity to the source language input to be translated. To efficiently use the translation suggestions, they may be encoded in context with the source language input to be translated, and the machine translation system may use the encoded translation suggestions with to generate a translation in the target language.

16 Claims, 5 Drawing Sheets

FUZZY-MATCH AUGMENTED MACHINE TRANSLATION

BACKGROUND

Models representing data relationships and patterns, such as functions, algorithms, systems, and the like, may accept input, and produce output that corresponds to the input in some way. For example, an input may represent a query or other text to be translated. A model may be trained to produce translated output that corresponds to the input, such as a version of the input that has been translated into a different language.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
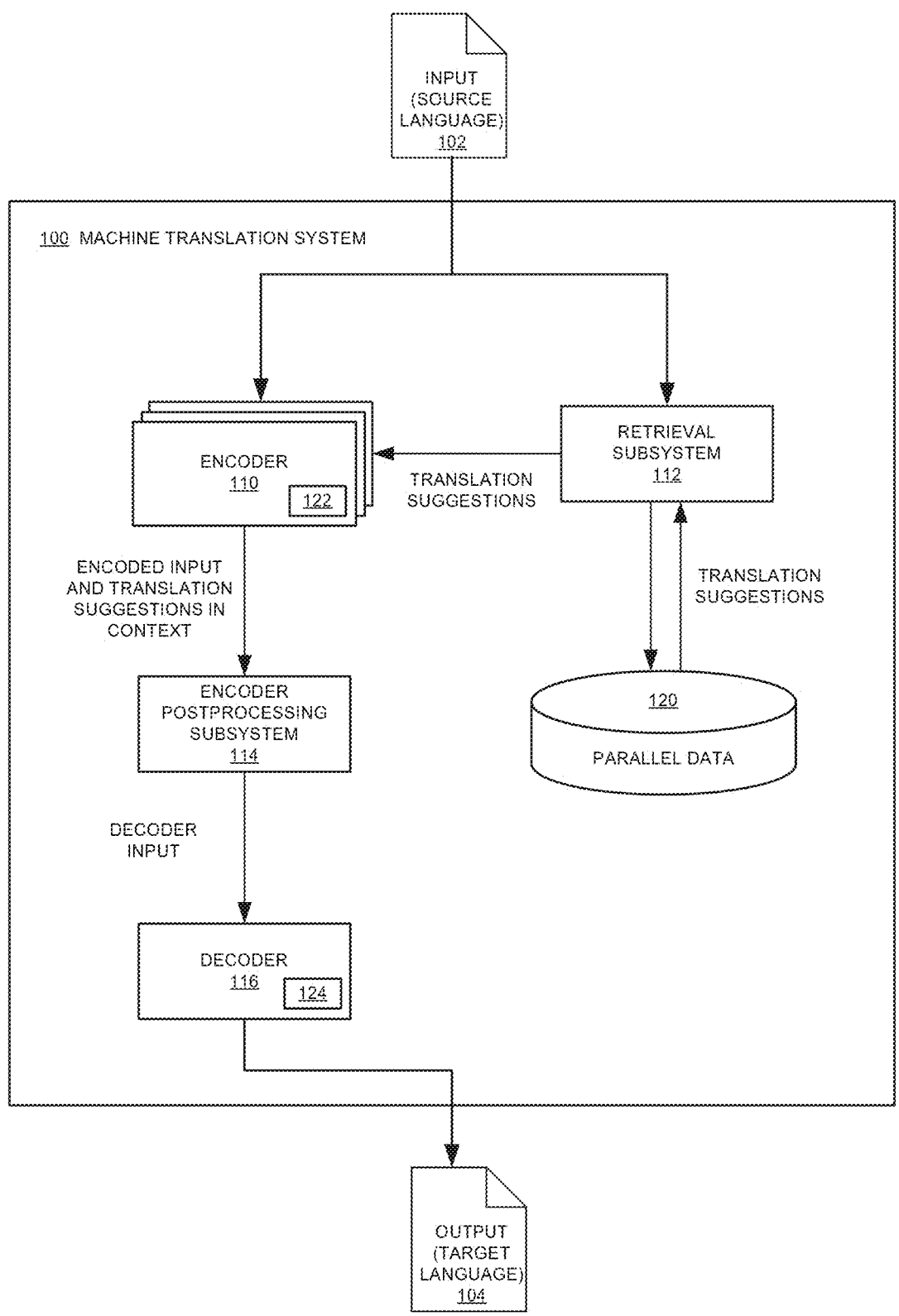
FIG. 1 is a block diagram depicting an illustrative augmented machine translation system including a retrieval subsystem to generate augmented input for translation according to some embodiments.

Generally described, the present disclosure relates to use of fuzzy-match-based translation suggestions to augment machine translation of input. A machine translation system may have a model trained using a technique in which input (e.g., a query, sentence, paragraph, text file, or the like) in a source language is translated to output in a target language based on pseudo-randomly selected translation suggestions in the target language. At inference time (e.g., after training, when non-training input is to be translated) the machine translation system may use translation suggestions associated with source language samples having a relatively high degree of similarity to the source language input to be translated. To efficiently use the target language translation suggestions (e.g., during training or at inference time), the target language translation suggestions may be encoded in context with the source language input to be translated. The machine translation system may use the encoded translation suggestions to generate a target language translation of the source language input. Beneficially, the systems and methods described herein can provide robust performance when translating source language input that differs from the source language samples associated with the available target language translation suggestions. Additionally, the systems and methods can help to reduce context fragmentation, complexity, and lack of context during encoding.

Some machine translation systems use models trained under a consistency assumption. For example, during training, a set of most similar translation suggestions is concatenated with each training input. The trained model is used at inference time in the same manner. However, due to the implicit or explicit consistency assumption under which the model is trained, it may not generalize well when faced with source language inputs that differ more substantively from the source language samples than the inputs encountered during training. Moreover, translation suggestions may be of arbitrary lengths or have a large maximum length. Thus, when the concatenated input is encoded for translation, the system may experience context fragmentation in which any long-term dependency beyond a predetermined context length is not captured. Additionally, lengthy input sizes resulting from concatenation of multiple translation suggestions to an input may cause an undesirably high degree of complexity during encoding, leading to latency issues. While some systems may mitigate these issues by encoding each translation suggestion separately, such encoding in isolation may suffer from lack of context.

Some aspects of the present disclosure address some or all of the issues noted above, among others, using a "shuffling" technique to train a model for use in machine translation, such as an encoder and/or decoder model. A decoder model may be configured to accept input that includes an encoded version of the source language input and encoded versions of one or more target language translation suggestions, such as k translation suggestions (where k is a positive integer). During inference, k translation suggestions for k source language texts that are most similar to the input to be translated are used in order to provide the model with the most relevant suggestions. At training, however, in order to avoid training the model to become overly reliant on the translation suggestions, k translation suggestions may be pseudo-randomly selected instead of using translation suggestions for the k most similar source language texts. In some embodiments, a candidate set of n source language texts may be identified. For example, the n source language texts that are most similar to the training input may be identified. From that candidate set, a smaller set of k source language texts, and therefore k target language translation suggestions, may be randomly selected (e.g., using a pseudo-random number generator or "PRNG"). In this way, overfitting of the model may be mitigated or avoided, and the trained model may generalize better at inference time when presented with source language input that differs more significantly from the available source language texts than did the source language inputs used in training the model(s).

Additional aspects of the present disclosure relate to separately encoding each of the translation suggestions and, when doing so, using a composite of the target language translation suggestions and source language input. In some embodiments, each target language translation suggestion is encoded in combination with the source language input to produce an encoding of the translation suggestion in the context of the current inference task. For example, if k translation suggestions are being used, then k+1 encoding processes may be performed: each individual translation suggestion may be encoded in context with the source language input but separately from each other translation suggestion, and the source language input may also be encoded separately from each translation suggestion. In this way, encoding complexity may be limited to a degree that is significantly lower than experienced when encoding all translation suggestions and the source language input as a single concatenated input. The output of the encoding process for a particular translation suggestion may include a first portion for the encoded source language input, and a second portion for the encoded translation suggestion. The second portion for the encoded translation suggestion may be extracted and included as input to a subsequent decoder or other subsystem of the machine translation system.

Further aspects of the present disclosure relate to encoding each of the translation suggestions in context (and, optionally, the source language input) concurrently or otherwise asynchronously. By encoding the translation suggestions concurrently, the total latency experienced between obtaining the translation suggestions and obtaining encoded translations generated therefrom may remain substantially constant (e.g., based on the complexity of the longest translation suggestion), regardless of the number of translation suggestions being encoded. In some embodiments, a single model or other set of encoding parameters may be shared among multiple encoder instances, possibly executed on different processors. Thus, the same encoding may be generated from any given translation suggestion and source language input pair, regardless of which encoder instance is generating the encoded translation suggestion.

Various aspects of the disclosure will now be described with regard to certain examples and embodiments, which are intended to illustrate but not limit the disclosure. Although aspects of some embodiments described in the disclosure will focus, for the purpose of illustration, on particular examples of encoders, decoders, algorithms, and data structures, the examples are illustrative only and are not intended to be limiting. In some embodiments, the techniques described herein may be applied to additional or alternative encoders, decoders, algorithms, data structures, and the like. Any feature used in any embodiment described herein may be used in any combination with any other feature, without limitation.

Example Machine Translation System

With reference to an illustrative embodiment, FIG. 1 shows an example machine translation system 100 in which features of the present disclosure may be implemented. The machine translation system 100 may be a logical association of one or more computing devices for ingesting input in a source language and generating output in a target language. As shown, the machine translation system 100 may any number of encoders 110 to encode input data, a retrieval subsystem 112 to retrieve translation suggestions from a parallel data store 120, a encoder postprocessing subsystem 114 to prepare encoded input data from the encoder(s) 110 for translation, and a decoder 116 to generate translated output in a target language.

The machine translation system 100 (or individual components thereof, such as the encoders 110, the retrieval subsystem 112, the encoder postprocessing subsystem 114, decoder 116, parallel data store 120, etc.) may be implemented on one or more physical server computing devices. In some embodiments, the machine translation system 100 (or individual components thereof) may be implemented on one or more host devices, such as blade servers, midrange computing devices, mainframe computers, desktop computers, or any other computing device configured to provide computing services and resources. For example, a single host device may execute one or more encoders 110, retrieval subsystems 112, encoder postprocessing subsystems 114, decoders 116, parallel data stores 120, some combination thereof, etc. The machine translation system 100 may include any number of such hosts.

In some embodiments, the features and services provided by the machine translation system 100 may be implemented as web services consumable via one or more communication networks, such as local area networks, intranets, and/or the internet. In further embodiments, the machine translation system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In an illustrative example, the machine translation system 100 may receive a source language input 102 to be translated to a target language output 104. In some embodiments, the source language may be any language in which tokens (e.g., words) are arranged according to a set of syntactical rules (e.g., syntax) to provide meaning. For example, the source language may be a language for human communication, such as English, Spanish, French, Mandarin, or the like. As another example, the language may be a logical or machine-based language such as C, C++, COBOL, Java, JavaScript, Python, or the like. The target language, like the source language, may be any language in which tokens are arranged according to a syntax. For example, if the source language is English, the target language may be one of Spanish, French, Mandarin, or the like.

The source language input 102 may be received as text data. For example, a user may enter a query or sentence into a user interface, select a file with the text to be translated, or provide the source language input text in some other manner. In some embodiments, the text data of the source language input 102 may be generated from input data received from a user. For example, a user may speak one or more sentences, and an automatic speech recognition ("ASR") system that is intenerated with or independent of the machine translation system 100 may generate text data from the utterance. Although the source language input may be referred to as an input query, the input does not necessarily need to be a question. In some embodiments, the source language input 102 may be or include any text data, including statements, definitions, answers, sentences, and/or paragraphs, longer works such as essays or articles, and the like.

The source language input 102 may be provided to one or more encoders 110 and to the retrieval subsystem 112. In some embodiments, the source language input 102 may be provided to both an encoder 110 and the retrieval subsystem 112 concurrently. In some embodiments, the source language input 102 may be provided first to one component or subsystem (e.g., the retrieval subsystem 112) and then to another (e.g., one or more encoders 110).

The retrieval subsystem 112 may obtain one or more translation suggestions from the parallel data store 120. In some embodiments, the parallel data store 120 may store at least two parallel sets of data: one set of samples in the source language, and a corresponding set of translation suggestions in the target language such that each translation suggestion in the parallel data store 120—or some subset thereof—is previously-generated translation text in the target language of a corresponding sample in the source language. The retrieval subsystem 112 may select a translation suggestion (or multiple translation suggestions) based on similarity data that represents a degree to which the translation suggestion is expected to be similar to a translation of the source language input 102. In some embodiments, the retrieval subsystem 112 may determine, for at least a subset of target language translation suggestions, a similarity metric representing a degree to which a corresponding source language sample is similar to the source language input to be translated. For example, the similarity metric may be, or be based on, a Levenshtein distance between the source language sample and the source language input. In some embodiments, the translation suggestions may be maintained in a monolingual data store without a parallel set of source language samples. In such cases, the retrieval subsystem 112 may use a different metric (e.g., cross-lingual similarity) or retrieval method (e.g., by back-translating the translation suggestions into the source language) to obtain the translation suggestions for a given source language input.

The retrieval subsystem 112 may therefore select one or more translation suggestions based on the determined similarity metrics or other similarity data. For example, the retrieval subsystem 112 may select the translation suggestion, or the k translation suggestions (where k is a positive integer), for which the corresponding sample(s) has/have the highest degree of similarity with the source language input. The selected translation suggestion(s) may then be provided to one or more encoders 110.

In some embodiments, the encoder 110 may be or include a machine learning model, such as model 122. The model 122 may be any of a variety of models configured to generate encoded data that may be decoded by another component to produce output. For example, the model 122 may be a neural-network-based machine learning model that uses attention and self-attention to encode input and produce encoded output (e.g., in the form of an encoded output vector).

An encoder 110 may generate an encoded version of the source language input 102 for translation. In addition, the encoder 110—or a separate instance of the encoder 110 or set of encoder 110 instances) may generate an encoded version of a translation suggestion in context with the source language input. For example, the encoder 110 may be configured as a joint vocabulary encoder, and therefore the encoder 110 may generate encoded output in which a first portion is an encoded version of the source language input (e.g., an encoded source language input portion), and a second portion is an encoded version of a target language translation suggestion (e.g., an encoded target language suggestion portion). If multiple translation suggestions are provided (e.g., k translation suggestions where k>1) the encoder 110 may repeat the process with each remaining translation suggestion.

In some embodiments, separate instances of the encoder 110 may access shared parameters for the model 122 or use their own instance-specific copy of the model 122 to generate encoded output in parallel, at least partially concurrently, or otherwise asynchronously. In this way, multiple encoded outputs (e.g., encoded source language input and encoded translation suggestions in context) may be generated with a reduction in latency compared to generating the encoded outputs in a serial manner using a single encoder 110 with a single copy of the model 122.

In some embodiments, separate instances of the encoder 110 may include or access different parameters for the model 122 to generate encoded output. Thus, the encoded outputs may be different depending upon the encoder instance and/or parameters used during a given encoding procedure.

The encoded source language input and encoded translation suggestion(s) may be provided to the encoder postprocessing subsystem 114. The encoder postprocessing subsystem 114 may generate decoder input for processing by the decoder 116 to generate a target language output 104 as a translation of the source language input 102 into the target language. In some embodiments, the encoder postprocessing subsystem 114 may extract an encoded version of a translation suggestion from encoded output generated from each translation suggestion, and include the encoded version of each translation suggestion with the encoded source language input in the decoder input. For example, the encoder postprocessing subsystem 114 may concatenate the encoded source language input with the encoded version of each translation suggestion to produce an input vector for the decoder 116. An example routine for generating decoder input is described in greater detail below.

In some embodiments, the decoder 116 may be or include a machine learning model, such as model 124. The model 124 may be any of a variety of models configured to decode encoded input data and produce decoded output. For example, the model 124 may be a neural-network-based machine learning model that produces decoded output in the form of a target language output 104, or output from which a target language output 104 may be derived, as a translated version of the source language input 102.

In one specific non-limiting embodiment, the encoder 110 and decoder 116 are implemented as a transformer with six encoder layers and six decoder layers. The hidden layer size may be set to 1024, and the maximum length of input may be limited to 1024 tokens. The transformer may use a joint source-target language sub-word vocabulary of size 32K (e.g., using the SentencePiece algorithm).

In some embodiments, the target language output 104 may be transmitted to the source of the source language input 102. For example, the target language output 104 may be transmitted to a user device on which the source language input 102 was entered. In some embodiments, the target language output 104 may also or alternatively be provided to a different device or system than the source of the source language input 102. For example, the source language input 102 may be submitted for batch or offline translation, and the resulting target language output 104 may be stored for future access.

Example Augmented Translation Routine

Figure 2:
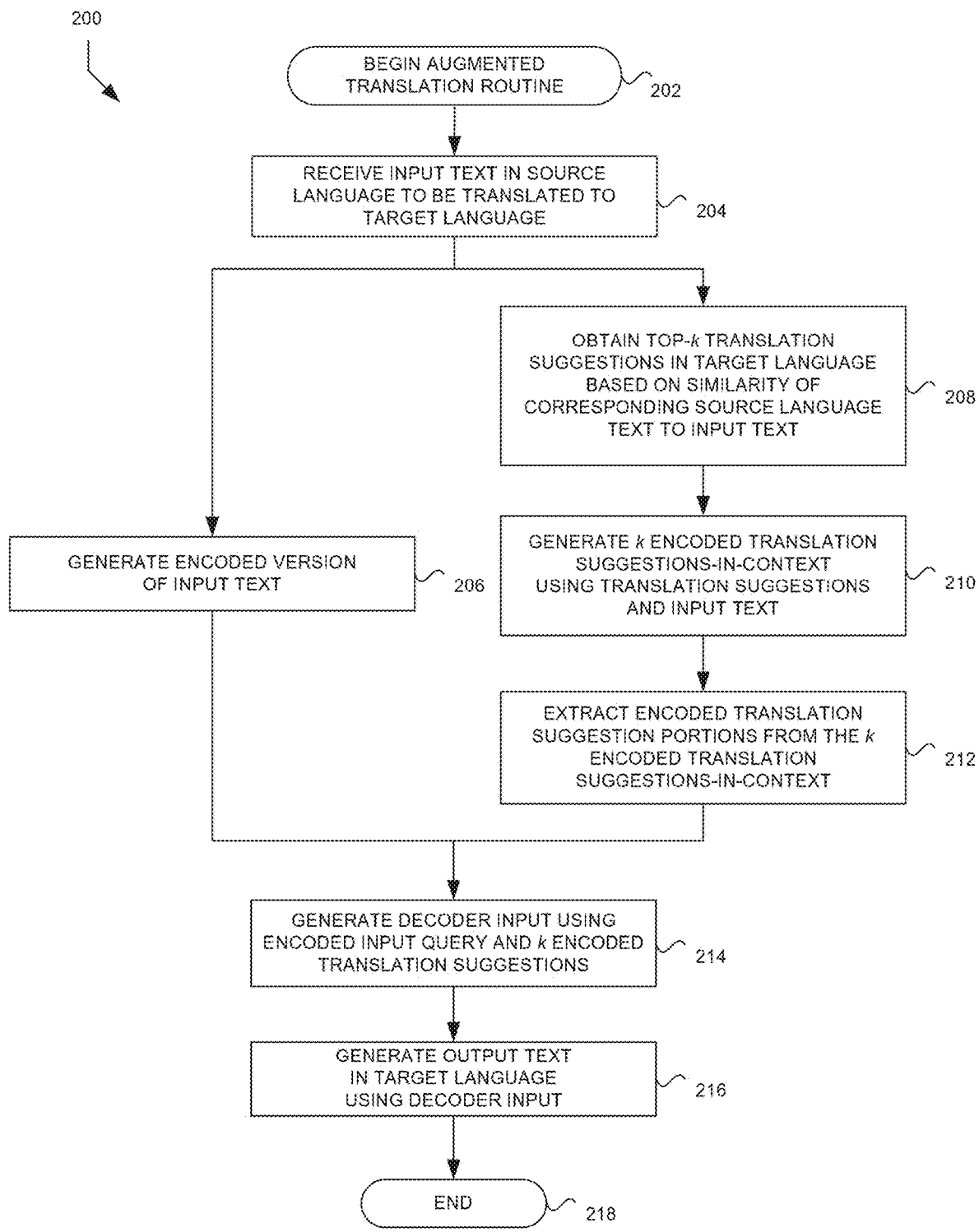
FIG. 2 is a flow diagram of an illustrative routine for generating and using augmented translation input to produce translated output according to some embodiments.

FIG. 2 is a flow diagram of an example routine 200 that a machine translation system 100 may execute to perform augmented translation of a source language input to a target language output. Advantageously, the routine 200 makes use of multiple translation suggestions encoded separately from each other but in context with the source language input. In some embodiments the translation suggestions may be encoded concurrently or otherwise asynchronously to mitigate latency that may be otherwise introduced when encoding multiple translation suggestions separately from each other. The routine 200 will be described with further reference to the example data flows and interactions illustrated in FIG. 3.

The routine 200 begins at block 202. In some embodiments, routine 200 may begin in response to an event, such as startup of operation of a machine translation system 100, establishment of a translation session with a user device, or in response to some other event. When the routine 200 begins, executable instructions may be loaded to or otherwise accessed in computer readable memory and executed by one or more computer processors, such as the memory and processors of computing system 500 described in greater detail below.

At block 204, the machine translation system 100 may receive a source language input 102 to be translated into a target language output 104. As shown in FIG. 2 and described herein, the routine 200 may proceed on concurrent or otherwise asynchronous paths to produce a translation of the source language input 102. For example, a single computing system may use multiple threads of execution. As another example, different processors or computing systems 500 may operate asynchronously.

Figure 3:
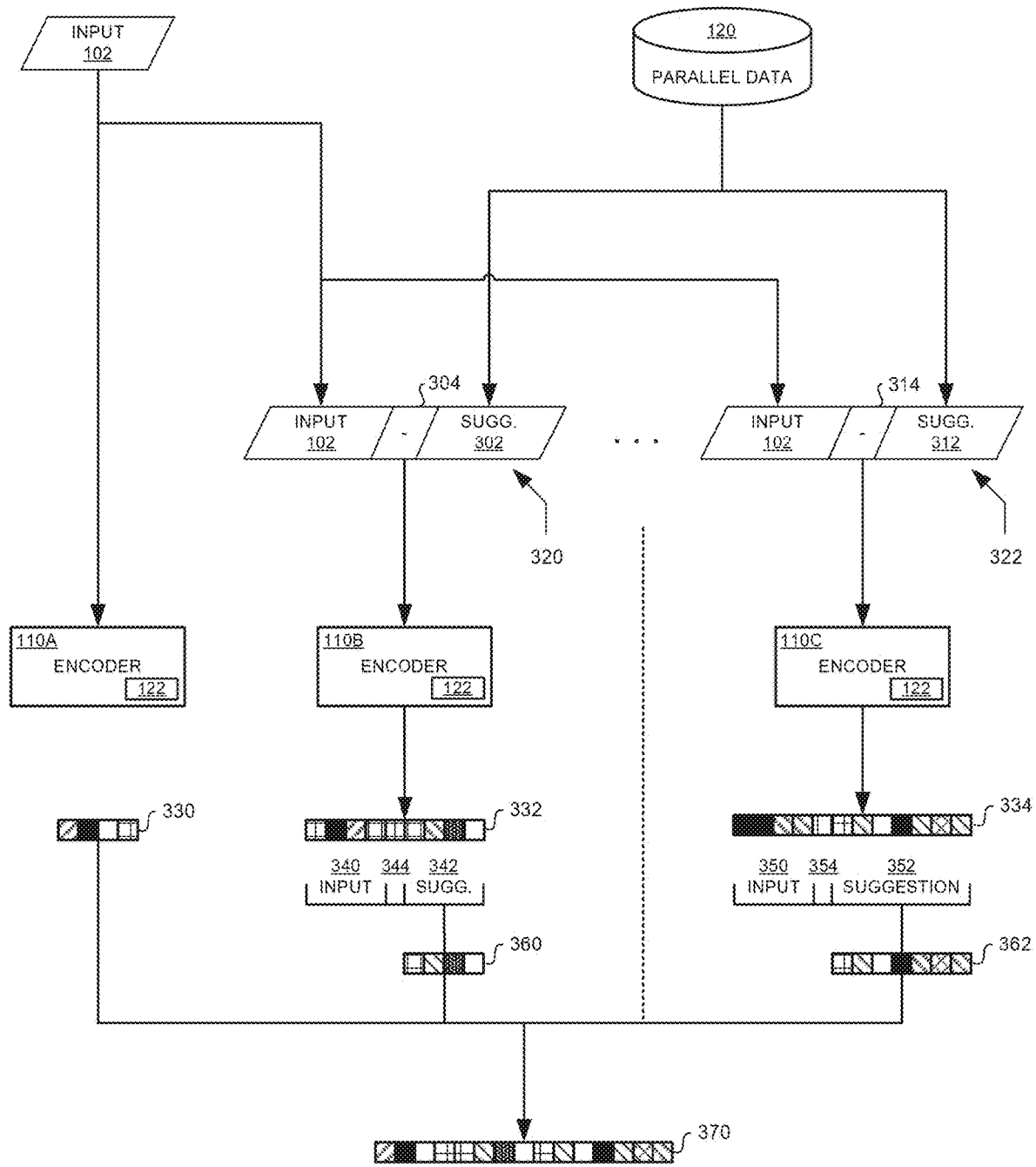
FIG. 3 is a block diagram of illustrative encoders configured to generate encoded translation suggestions in context according to some embodiments.

At block 206, an encoder may generate encoded source language input data. As shown in FIG. 3, an encoder 110A may receive the source language input 102 and generate encoded source language input vector 330. For example, the encoded source language input vector 330 may be structured as a vector.

At block 208, the retrieval subsystem 112 may obtain, from the parallel data store 120, the top k translation suggestions in the target language. The top k translation suggestions may be selected based on the similarity of their corresponding source language samples to the source language input. In some embodiments, the retrieval subsystem 112 may execute a retrieval algorithm in which the retrieval subsystem 112 performs a search by computing lexical matches of the source language input with all source language samples (or some subset thereof) in the parallel data store 120 to obtain top-ranked samples. For example, the retrieval subsystem 112 or parallel data store 120 may include an index using the source language samples. For every source language input, the retrieval subsystem 112 may collect top k similar source language samples and then use their corresponding translations as the target language translation suggestions.

In some embodiments, k may static from input to input such that the same number translation suggestions (k) are selected for each input. In some embodiments, k may be variable such that the number of translation suggestions differs from input to input. For example, a selection criterion may be employed in which a translation suggestion is selected for the set of k translation suggestions if the translation suggestion's corresponding source language sample is one of the j most-similar to the source language inputs (where j is a positive integer) and also the similarity metric satisfies a threshold (e.g., meets or exceeds a minimum value).

At block 210, one or more encoders may be used to generate k encoded translation suggestions in context using the translation suggestions and the source language input. Encoding a translation suggestion in context may include concatenating the translation suggestion with the source language input and a separator. The separator may be included to facilitate extraction of the encoded portion that corresponds to the translation suggestion.

In some embodiments, as shown in FIG. 3, translation suggestion 302 and source language input 102 are concatenated with separator 304 to produce a translation suggestion in context 320. Illustratively, the separator 304 may be a predetermined token or value that serves to internally separate portions of concatenated data into discrete or otherwise separately accessible elements. The resulting output may be a vector that represents translation suggestion in context 320, and may be provided to an encoder 110B. The encoder 110B generates encoded output vector 332 (also referred to as encoded translation suggestion vector 332) that includes a first encoded portion for the encoded source language input 340 (also referred to as encoded source language input portion 340) and a second encoded portion that is the encoded translation suggestion 342 (also referred to as encoded translation suggestion portion 342). The portions may be separated by an encoded separator portion 344. The same operations may be performed for each of the remaining k translation suggestions. For example, translation suggestion 312 and source language input 102 are concatenated with separator 314 to produce a translation suggestion in context 322. The resulting output may be a vector that represents translation suggestion in context 322, and may be provided to an encoder 110C. The encoder 110C generates encoded output vector 334 (also referred to as encoded translation suggestion vector 334) that includes a first encoded portion for the encoded source language input 350 (also referred to as encoded source language input portion 350) and a second encoded portion that is the encoded translation suggestion 352 (also referred to as encoded translation suggestion portion 352). The portions may be separated by an encoded separator portion 354.

As represented in FIG. 3 by the various combinations of shading and textures of the encoded source language input vector 330 and the encoded translation suggestion vectors 332 and 334, the encoded source language input 340 generated while encoding translation suggestion in context 320 and the encoded source language input 350 generated while encoding translation suggestion in context 322 are different from each other and from the encoded source language input vector 330 due to encoding in context of translation suggestions 302 and 312, respectively. Similarly, encoded translation suggestion 342 and encoded translation suggestion 352 would be different if encoded in context with a different source language input. In some embodiments, as shown, encoded translation suggestion 342 and encoded translation suggestion 352 may be of different lengths. This may be a result of differing lengths (e.g., quantity of tokes) of translation suggestions 302 and 312, respectively.

At block 212, the encoder postprocessing subsystem 114 or some other module or component may extract the encoded translation suggestion(s) from encoded output generated using the k translation suggestions. As shown in FIG. 3, the encoded output vector 332 may be evaluated, and encoded translation suggestion 342 may be extracted to produce translation suggestion vector 360. For example, based on the position of encoded separator portion 344, the remainder of encoded output vector 332 which corresponds to encoded translation suggestion 342 may be extracted to produce translation suggestion vector 360. The same operations may be performed for each of the remaining k translation suggestions. For example, based on the position of encoded separator portion 354, the remainder of encoded output vector 334 which corresponds to encoded translation suggestion 352 may be extracted to produce translation suggestion vector 362.

At block 214, the encoder postprocessing subsystem 114 or some other module or component may generate decoder input using the encoded source language input and k encoded translation suggestions extracted from encoder output. Generating decoder input may include concatenating the encoded source language input and encoded translation suggestions to produce a decoder input vector. As shown in FIG. 3, encoded source language input vector 330 may be concatenated with translation suggestion vector 360 and translation suggestion vector 362 to produce decoder input vector 370.

At block 216, the decoder 116 may generate a translation of the source language input 102 in the target language.

At block 218, routine 200 may terminate.

Example Routine for Augmented Translation Training with Shuffling

Figure 4:
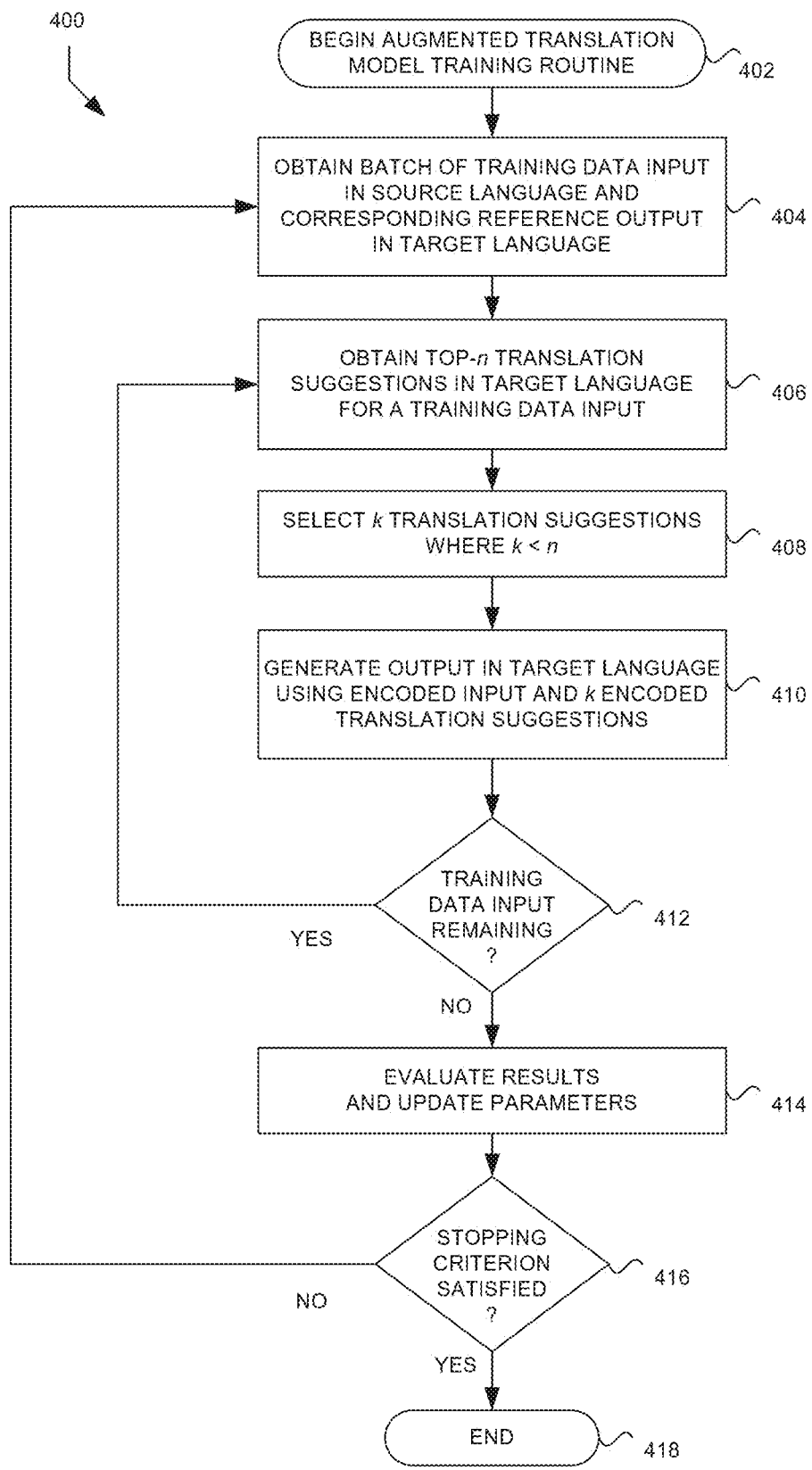
FIG. 4 is a flow diagram of an illustrative routine for training one or more models of an augmented machine translation system according to some embodiments.

FIG. 4 is a flow diagram of an example routine 400 that a machine translation system 100 may execute to train one or more models for augmented translation. Advantageously, the routine 400 makes use of pseudo-randomly selected translation suggestions to produce a robust model that is able to generalize in the presence of input that differs substantively from the source language samples associated with the translation suggestions used in training and available at interference time.

The routine 400 begins at block 402. In some embodiments, routine 400 may begin in response to an event, such as startup of operation of a machine translation system 100, establishment of a training session, or in response to some other event. When the routine 400 begins, executable instructions may be loaded to or otherwise accessed in computer readable memory and executed by one or more computer processors, such as the memory and processors of computing system 500 described in greater detail below.

At block 404, the machine translation system 100 may obtain training data to be used to train one or more models, such as an encoder model 122 and/or a decoder model 124. In some embodiments, the training data may be or include a batch of training data inputs in a source language and corresponding reference outputs in a target language. The machine translation system 100 uses the training data to train one or more models to produce, from the training data inputs augmented with one or more translation suggestions, output that is close to the reference data outputs.

At block 406, the machine translation system 100 may obtain, for a particular training data source language input, a candidate set of translation suggestions in the target language. As described in greater detail herein, the machine translation system 100 may use a decoder that is configured to consider k translation suggestions (where k is a positive integer). At inference time, the machine translation system 100 may use the k translation suggestion(s) that are translations of source language samples most similar, among the samples in a corpus of training translation suggestions (e.g., from a parallel training data store), to the current source language input. During training, the machine translation system 100 may select or access a candidate set of n translation suggestions that are translations of source language samples most similar, among the available samples in the training translation suggestions, to the current training data source language input, where n>k. In some embodiments, n may be a multiple of k, or an order of magnitude greater than k. In one specific non-limiting embodiment, k=3 and n=10.

In some embodiments, the retrieval subsystem 112 may access different corpora of translation suggestions during training and inference. For example, one corpus of translation suggestions may be used during training, while a different (and in some cases not previously seen) corpus of translation suggestions may be accessed during interference.

At block 408, the machine translation system 100 may select k translation suggestions from the n translation suggestions obtained at block 406, above. Selection of the k translation suggestions from the candidate set of n translation suggestions may performed in a pseudo-random manner. In some embodiments, the machine translation system 100 may use a PSNG or a probabilistic sampling method to determine k numbers from a domain of n numbers. The randomly determined numbers may be used as indices or ordinals for selection of translation suggestions from the candidate set. For example, if k=3 and n=10, the machine translation system 100 may generate 3 random numbers between 0 and 9. The candidate set of translation suggestions may be ordered according to similarity of the corresponding source language samples with the current training data source language input (e.g., the translation suggestion of the source language sample that is most similar to the training data source language input may be in the first position or "0" index, the translation suggestion of the source language sample that is second most similar to the training data source language input may be in the second position or "1" index, and so on). The translation suggestions at the k randomly-selected indices may be used with the current training data source language input. In this way, the model being trained is presented with translation suggestions of varying degrees of similarity to the current training data source language input, and does not rely on the translation suggestions to the same degree as would be the case if only translation suggestions for the most similar queries are used. Thus, when a source language input is to be translated that differs substantively from the source language samples in the parallel training data (e.g., the most similar source language sample is not substantially similar to the source language input), the model may generalize and produce acceptable results.

At block 410, the machine translation system 100 may generate a target language output 104 using the training data source language input and k translation suggestions. In some embodiments, the machine translation system 100 may produce decoder input as encoded source language input data using an encoder 110 and model 122, and then decode the encoded source language input data to produce target language output using a decoder 116 and model 124, as described in greater detail above with respect to operation of the machine translation system 100 at inference time.

At decision block 412 the machine translation system 100 may determine whether there are remaining training data input text in the batch to be evaluated. If so, the routine 400 may return to block 406. Otherwise, if there are not remaining training data input text to be evaluated, the routine 400 may proceed to block 414.

At block 414, the machine translation system 100 can evaluate the results of processing one or more training data input texts using the model(s) being trained. In some embodiments, the machine translation system 100 may evaluate the results using a loss function, such as a binary cross entropy loss function, a weighted cross entropy loss function, a squared error loss function, a softmax loss function, some other loss function, or a composite of loss functions. The loss function can evaluate the degree to which training data output generated using the model(s) differ from the desired output (e.g., reference data output vectors representing reference output text) for a corresponding training data input text. The machine translation system 100 can update parameters of one or more models (e.g., model 122 and/or model 124) based on evaluation of the results of processing one or more training input texts using the model(s). The parameters may be updated so that if the same training data input texts are processed again, the output produced using the model(s) will be closer to the desired output represented by the reference data output vectors. In some embodiments, the machine translation system 100 may compute a gradient based on differences between the training data output vectors and the reference data output vectors. For example, a gradient (e.g., a derivative) of the loss function can be computed. The gradient can be used to determine the direction in which individual parameters of a model 122 and/or 124 are to be adjusted in order to improve the model output (e.g., to produce output that is closer to the correct or desired output for a given input). The degree to which individual parameters are adjusted may be predetermined or dynamically determined (e.g., based on the gradient and/or a hyper parameter). For example, a hyper parameter such as a learning rate may specify or be used to determine the magnitude of the adjustment to be applied to individual parameters of a model.

In some embodiments, the machine translation system 100 can compute the gradient for a subset of the training data, rather than the entire set of training data. Therefore, the gradient may be referred to as a "partial gradient" because it is not based on the entire corpus of training data. Instead, it is based on the differences between the training data output vectors and the reference data output vectors when processing only a particular subset of the training data.

With reference to an illustrative embodiment, the machine translation system 100 can update some or all parameters of a neural network machine learning model 122 or 124 (e.g., the weights of the model) using a gradient descent method with back propagation. In back propagation, a training error is determined using a loss function (e.g., as described above). The training error may be used to update the individual parameters of the model in order to reduce the training error. For example, a gradient may be computed for the loss function to determine how the weights in the weight matrices are to be adjusted to reduce the error. The adjustments may be propagated back through the model layer-by-layer.

At decision block 416, the machine translation system 100 may determine whether one or more stopping criteria have been satisfied. For example, a stopping criterion can be based on the accuracy of the model(s) being trained, as determined using a loss function, a test set, or both. As another example, a stopping criterion can be based on the number of iterations (e.g., "epochs") of training that have been performed, the elapsed training time, or the like. If the one or more stopping criteria have not been met, the routine 400 may return to block 404 to continue training. Otherwise, if the one or more stopping criteria are satisfied, the routine 400 may terminate at block 418.

Execution Environment

Figure 5:
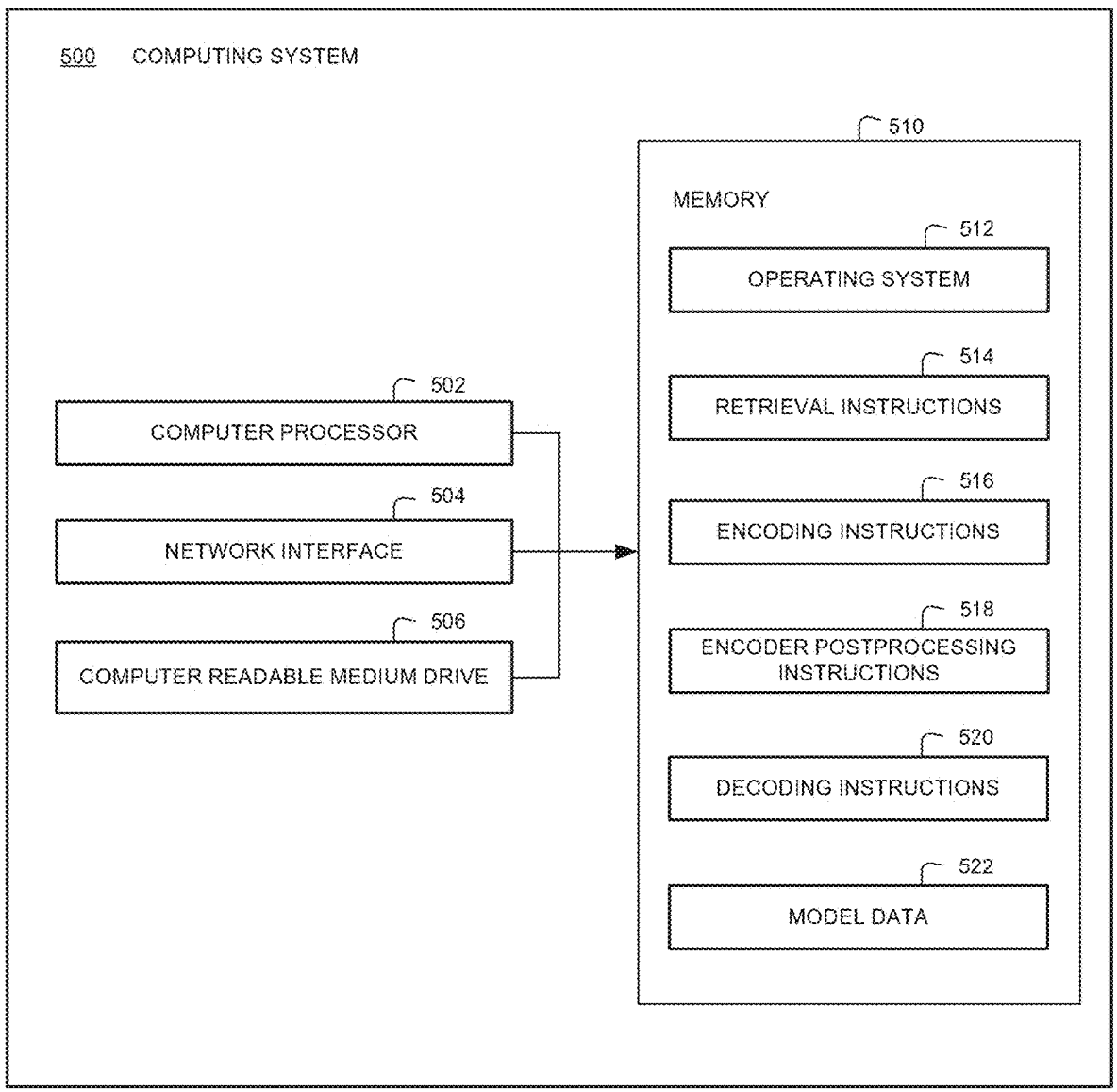
FIG. 5 is a block diagram of an illustrative computing system configured to implement features of some embodiments.

FIG. 5 illustrates various components of an example computing system 500 configured to implement various functionality described herein. The computing system 500 may be a physical host computing device on which a machine translation system 100 or some portion thereof is implemented.

In some embodiments, as shown, a computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; and one or more computer readable memories 510, such as random access memory ("RAM") and/or other volatile non-transitory computer readable media.

The computer readable memory 510 may include computer program instructions that one or more computer processors 502 execute and/or data that the one or more computer processors 502 use in order to implement one or more embodiments. For example, the computer readable memory 510 can store an operating system 512 to provide general administration of the computing system 500. As another example, the computer readable memory 510 can store retrieval instructions 514 for selecting and retrieving translation suggestions in a target language that correspond to the k and/or n source language samples most similar to a source language input. As another example, the computer readable memory 510 can store encoding instruction 516 for encoding input queries alone and/or in combination with translation suggestions. As another example, the computer readable memory 510 can store preprocessing instructions 518 for preparing decoder input from encoded input queries and translation suggestions in context. As another example, the computer readable memory 510 can store decoding instructions 520 for decoding the decoder input and generating a translated output query in the target language that corresponds to a source language input. As another example, the computer readable memory 510 can store model data 522 (e.g., model parameters) for one or more models used to encode and/or decode inputs and translation suggestions.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a data store storing a plurality of translation suggestions in a target language and a plurality of corresponding source language samples in a source language; and
   a computing system comprising one or more computer processors and computer readable memory, wherein the computing system is configured to at least:
      receive an input text representing a query in the source language;
      retrieve, from the data store, a subset of the plurality of translation suggestions, wherein a first translation suggestion of the plurality of translation suggestions is associated with a first source language sample, and wherein the first translation suggestion is included in the subset based on a similarity metric that represents a similarity between the input text and the first source language sample;
      generate a plurality of encoded translation suggestion vectors based at least partly on a set of encoding parameters,
         wherein the plurality of encoded translation suggestion vectors are generated using the input text and the subset of the plurality of translation suggestions,
         wherein a first encoded translation suggestion vector of the plurality of encoded translation suggestion vectors comprises an encoded translation suggestion portion associated with the first translation suggestion and an encoded source language input portion associated with the input text;
         wherein the first encoded translation suggestion vector is generated using a first computer processor and a first copy of the set of encoding parameters, and
         wherein a second encoded translation suggestion vector is generated concurrently with at least a portion of the first encoded translation suggestion vector using a second computer processor and a second copy of the set of encoding parameters;
      extract, from the plurality of encoded translation suggestion vectors, a plurality of encoded translation suggestion portions;
      generate an encoded source language input vector based at least partly on the set of encoding parameters and the input text;
      generate a decoder input vector using the encoded source language input vector and the plurality of encoded translation suggestion portions; and
      generate a translated output text in the target language using a decoder and the decoder input vector.

2. The system of claim 1, wherein to generate the encoded source language input vector, the computing system is further configured to generate the encoded source language input vector using a third computer processor, wherein the third computer processor comprises a third copy of the set of encoding parameters, and wherein the encoded source language input vector is generated concurrently with at least a portion of the first encoded translation suggestion vector.

3. The system of claim 1, wherein the computing system is further configured to select the first translation suggestion from the subset of the plurality of translation suggestions based at least partly on a pseudo-random number generator, wherein the input text comprises a training data input query, and wherein the translated output text comprises a training data output text.

4. A computer-implemented method comprising:
under control of a computing system comprising one or more computer processors configured to execute specific instructions:
receiving a source language input in a source language to be translated into a target language output in a target language;
generating a first similarity metric representing a degree of similarity of a first source language sample with the source language input and a second similarity metric representing a degree of similarity of a second source language sample with the source language input;
selecting a first translation suggestion, associated with the first source language sample, to be included in a plurality of translation suggestions based on a comparison of the first similarity metric to the second similarity metric;
generating an encoded source language input based at least partly on the source language input;
generating a plurality of encoded translation suggestions using the plurality of translation suggestions, wherein a first encoded translation suggestion is generated based at least partly on the source language input and the first translation suggestion; and
generating the target language output based at least partly on the encoded source language input and the plurality of encoded translation suggestions.

5. The computer-implemented method of claim 4, wherein generating the plurality of encoded translation suggestions comprises:
generating a first encoded translation suggestion vector using the source language input and the first translation suggestion, wherein the first encoded translation suggestion vector comprises a first encoded translation suggestion portion associated with the first translation suggestion and an encoded source language input portion associated with the source language input; and
extracting the first encoded translation suggestion portion from the first encoded translation suggestion vector, wherein a first encoded translation suggestion of the plurality of encoded translation suggestions comprises the first encoded translation suggestion portion.

6. The computer-implemented method of claim 5, further comprising generating a decoder input vector using the encoded source language input and a plurality of encoded translation suggestion portions, wherein the target language output is generated using the decoder input vector and a decoder trained to generate output in the target language from the decoder input vector comprising the encoded source language input and the plurality of encoded translation suggestion portions.

7. The computer-implemented method of claim 4, wherein generating the plurality of encoded translation suggestions comprises:
generating the first encoded translation suggestion using a first encoder; and
generating a second encoded translation suggestion using a second encoder, wherein the second encoded translation suggestion is generated at partially concurrently with generating the first encoded translation suggestion.

8. The computer-implemented method of claim 7, wherein the encoded source language input is generated using a third encoder at least partially concurrently with generating the first encoded translation suggestion.

9. The computer-implemented method of claim 4, wherein generating the plurality of encoded translation suggestions comprises:
generating the first encoded translation suggestion using an encoder; and
generating a second encoded translation suggestion using the encoder.

10. The computer-implemented method of claim 9, wherein the encoded source language input is generated using the encoder.

11. The computer-implemented method of claim 4, further comprising:
receiving a training data source language input in the source language to be translated into the target language;
obtaining a candidate set of translation suggestions from a corpus of translation suggestions based at least partly on a similarity of each source language sample, associated with a translation suggestion of the candidate set of translation suggestions, with the training data source language input;
selecting a subset of the candidate set of translation suggestions based at least partly on at least one of: a pseudo-random number generator, or a probabilistic sampling method; and
training an encoder model based at least partly on the subset of the candidate set of translation suggestions.

12. A system comprising:
computer readable memory storing executable instructions; and
one or more processors in communication with the computer readable memory and programmed by the executable instructions to at least:
receive a source language input in a source language to be translated into a target language output in a target language;
generate a first similarity metric representing a degree of similarity of a first source language sample with the source language input and a second similarity metric representing a degree of similarity of a second source language sample with the source language input;
select a first translation suggestion, associated with the first source language sample, to be included in a plurality of translation suggestions based on a comparison of the first similarity metric to the second similarity metric;
generate an encoded source language input based at least partly on the source language input;
generate a plurality of encoded translation suggestions using the plurality of translation suggestions, wherein a first encoded translation suggestion is generated based at least partly on the source language input and the first translation suggestion; and
generate the target language output based at least partly on the encoded source language input and the plurality of encoded translation suggestions.

13. The system of claim 12, wherein to generate the plurality of encoded translation suggestions, the one or more processors are programmed by further executable instructions to:
generate a first encoded translation suggestion vector using the source language input and the first translation suggestion, wherein the first encoded translation suggestion vector comprises a first encoded translation suggestion portion associated with the first translation suggestion and an encoded source language input portion associated with the source language input; and extract the first encoded translation suggestion portion from the first encoded translation suggestion vector, wherein a first encoded translation suggestion of the plurality of encoded translation suggestions comprises the first encoded translation suggestion portion.

14. The system of claim 13, wherein the one or more processors are programmed by further executable instructions to generate a decoder input vector using the encoded source language input and a plurality of encoded translation suggestion portions, wherein the target language output is generated using the decoder input vector and a decoder trained to generate output in the target language from the decoder input vector comprising the encoded source language input and the plurality of encoded translation suggestion portions.

15. The system of claim 12, wherein to generate the plurality of encoded translation suggestions, the one or more processors are programmed by further executable instructions to:

generate the first encoded translation suggestion using a first encoder; and generate a second encoded translation suggestion using a second encoder, wherein the second encoded translation suggestion is generated at partially concurrently with generating the first encoded translation suggestion;

wherein the encoded source language input is generated using a third encoder at least partially concurrently with generating the first encoded translation suggestion.

16. The system of claim 12, wherein to generate the plurality of encoded translation suggestions, the one or more processors are programmed by further executable instructions to:

generate the first encoded translation suggestion using an encoder; and generate a second encoded translation suggestion using the encoder.

* * * * *

UNITED STATES PATENT AND TRADEMARK OFFICE
CERTIFICATE OF CORRECTION

PATENT NO. : 12,333,264 B1
APPLICATION NO. : 17/655624
DATED : June 17, 2025
INVENTOR(S) : Cuong Hoang Page 1 of 1

It is certified that error appears in the above-identified patent and that said Letters Patent is hereby corrected as shown below:

In the Specification

Column 7, Line 28, delete "k may static" and insert -- k may be static --.

Column 8, Line 28, delete "of tokes) of" and insert -- of tokens) of --.

Signed and Sealed this
Nineteenth Day of August, 2025

Coke Morgan Stewart
*Acting Director of the United States Patent and Trademark Office*